US012574824B2

(12) United States Patent
Kita

(10) Patent No.: US 12,574,824 B2
(45) Date of Patent: Mar. 10, 2026

(54) COMMUNICATION ROUTE DETERMINATION SYSTEM AND COMMUNICATION ROUTE DETERMINATION METHOD

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 472 days.

(21) Appl. No.: 18/042,296

(22) PCT Filed: Mar. 30, 2022

(86) PCT No.: PCT/JP2022/016255
§ 371 (c)(1),
(2) Date: Feb. 20, 2023

(87) PCT Pub. No.: WO2023/188187
PCT Pub. Date: Oct. 5, 2023

(65) Prior Publication Data
US 2024/0276343 A1 Aug. 15, 2024

(51) Int. Cl.
*H04L 12/28* (2006.01)
*H04L 41/0895* (2022.01)
(Continued)

(52) U.S. Cl.
CPC ....... *H04W 40/248* (2013.01); *H04L 41/0895* (2022.05); *H04W 40/12* (2013.01)

(58) Field of Classification Search
CPC ............................ H04W 40/24; H04W 40/248
See application file for complete search history.

(56) References Cited

U.S. PATENT DOCUMENTS

| | | | |
|---|---|---|---|
| 11,228,499 B1 | 1/2022 | Maruyama et al. | |
| 2020/0008066 A1* | 1/2020 | Cui ....................... | H04W 16/02 |

(Continued)

FOREIGN PATENT DOCUMENTS

| | | | |
|---|---|---|---|
| EP | 3661133 A1 | 6/2020 | |
| EP | 3681105 B1 * | 3/2023 | ......... H04L 41/0897 |

(Continued)

OTHER PUBLICATIONS

International Searching Authority, English Translation of the Written Opinion of the International Searching Authority PCT/JP2022/016255, Sep. 29, 2024, WIPO, pp. 1-4. (Year: 2024).*

(Continued)

*Primary Examiner* — Elisabeth Benoit Magloire
(74) *Attorney, Agent, or Firm* — HAUPTMAN HAM, LLP

(57) ABSTRACT

An inventory database stores device data indicating an Internet Protocol (IP) address of a network device, performance specifications of the network device relating to the IP address, and an IP address of a network device enabled to perform IP communication with the network device. A software-defined networking (SDN) controller receives a communication route determination request in which a pair of IP addresses and a performance requirement relating to a communication route between the IP addresses are linked, and which is issued for a network slice. The SDN controller determines, based on the device data, the communication route in the network slice, which passes through at least one of the network devices, and which satisfies the performance requirement between the IP addresses.

6 Claims, 14 Drawing Sheets

| AGID | PORT ID | IP ADDRESS DATA | CONNECTION PORT DATA | ACTIVE SLICE ID | STANDBY SLICE ID | CAPACITY DATA | FAILURE PRESENCE-OR-ABSENCE DATA |
|---|---|---|---|---|---|---|---|
| 1001 | 1 | a1.a1.a1.a1 | 1002/1 | 11 | 12 | p1 | NO FAILURE |
| 1001 | 2 | a2.a2.a2.a2 | 1002/2 | | | p2 | NO FAILURE |
| 1001 | 3 | a3.a3.a3.a3 | 1002/3 | | | p3 | WITH FAILURE |
| 1001 | 4 | a4.a4.a4.a4 | 1003/1 | 12 | 11 | p4 | NO FAILURE |
| 1001 | 5 | a5.a5.a5.a5 | 1003/2 | | | p5 | NO FAILURE |
| 1010 | 1 | j1.j1.j1.j1 | 1008/1 | 11 | 12 | q1 | NO FAILURE |
| 1010 | 2 | j2.j2.j2.j2 | 1008/2 | | | q2 | NO FAILURE |
| 1010 | 3 | j3.j3.j3.j3 | 1008/3 | | | q3 | NO FAILURE |
| 1010 | 4 | j4.j4.j4.j4 | 1009/1 | 12 | 11 | q4 | NO FAILURE |
| 1010 | 5 | j5.j5.j5.j5 | 1009/2 | | | q5 | NO FAILURE |

(51) Int. Cl.
  *H04W 40/12*     (2009.01)
  *H04W 40/24*     (2009.01)

(56)              References Cited

U.S. PATENT DOCUMENTS

| | | | |
|---|---|---|---|
| 2020/0137678 A1 | 4/2020 | Katsumata et al. | |
| 2020/0221346 A1 | 7/2020 | Park et al. | |
| 2020/0228405 A1 | 7/2020 | Fang | |
| 2020/0366546 A1 | 11/2020 | Kommula et al. | |
| 2020/0366607 A1* | 11/2020 | Kommula | H04L 45/306 |
| 2020/0366612 A1 | 11/2020 | Kommula et al. | |
| 2021/0075697 A1* | 3/2021 | Dattagupta | H04L 41/0895 |
| 2021/0112428 A1* | 4/2021 | Young | H04L 41/0895 |
| 2021/0314266 A1* | 10/2021 | Li | H04L 47/2441 |
| 2022/0141751 A1* | 5/2022 | Yao | H04W 28/0861 |
| | | | 370/331 |
| 2023/0275828 A1* | 8/2023 | Krishnaswamy | H04L 45/28 |
| | | | 370/389 |
| 2024/0275887 A1* | 8/2024 | Guo | H04W 28/0268 |

FOREIGN PATENT DOCUMENTS

| | | | |
|---|---|---|---|
| JP | 2016139296 A | 8/2016 |
| JP | 2020532216 A | 11/2020 |
| JP | 2020536434 A | 12/2020 |
| JP | 202232955 A | 2/2022 |
| WO | 2018173564 A1 | 9/2018 |

OTHER PUBLICATIONS

International Search Report in PCT/JP2022/016255, mailed on Jun. 21, 2022, 3pp.

* cited by examiner

FIG.6

| SERVER ID |
| --- |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

FIG.7

| NFID | NF TYPE DATA | IP ADDRESS DATA |
|------|--------------|-----------------|
| 101  | CU-UP        | a0.a0.a0.a0     |
| 501  | UPF          | b0.b0.b0.b0     |

FIG.8

| AGID | PORT ID | IP ADDRESS DATA | CONNECTION PORT DATA | ACTIVE SLICE ID | STANDBY SLICE ID | CAPACITY DATA | FAILURE PRESENCE-OR-ABSENCE DATA |
|---|---|---|---|---|---|---|---|
| 1001 | 1 | a1.a1.a1.a1 | 1002/1 | 11 | | p1 | NO FAILURE |
| 1001 | 2 | a2.a2.a2.a2 | 1002/2 | | | p2 | NO FAILURE |
| 1001 | 3 | a3.a3.a3.a3 | 1002/3 | | | p3 | WITH FAILURE |
| 1001 | 4 | a4.a4.a4.a4 | 1003/1 | | 11 | p4 | NO FAILURE |
| 1001 | 5 | a5.a5.a5.a5 | 1003/2 | | | p5 | NO FAILURE |
| 1010 | 1 | j1.j1.j1.j1 | 1008/1 | 11 | | q1 | NO FAILURE |
| 1010 | 2 | j2.j2.j2.j2 | 1008/2 | | | q2 | NO FAILURE |
| 1010 | 3 | j3.j3.j3.j3 | 1008/3 | | | q3 | NO FAILURE |
| 1010 | 4 | j4.j4.j4.j4 | 1009/1 | | 11 | q4 | NO FAILURE |
| 1010 | 5 | j5.j5.j5.j5 | 1009/2 | | | q5 | NO FAILURE |

FIG.10

| NFID | NF TYPE DATA | IP ADDRESS DATA |
|---|---|---|
| 101 | CU-UP | a0.a0.a0.a0 |
| 102 | CU-UP | c0.c0.c0.c0 |
| 501 | UPF | b0.b0.b0.b0 |
| 502 | UPF | d0.d0.d0.d0 |

FIG.13

| AGID | PORT ID | IP ADDRESS DATA | CONNECTION PORT DATA | ACTIVE SLICE ID | STANDBY SLICE ID | CAPACITY DATA | FAILURE PRESENCE-OR-ABSENCE DATA |
|------|---------|-----------------|----------------------|-----------------|------------------|---------------|----------------------------------|
| 1001 | 1 | a1.a1.a1.a1 | 1002/1 | 11 | 12 | p1 | NO FAILURE |
| 1001 | 2 | a2.a2.a2.a2 | 1002/2 |    |    | p2 | NO FAILURE |
| 1001 | 3 | a3.a3.a3.a3 | 1002/3 |    |    | p3 | WITH FAILURE |
| 1001 | 4 | a4.a4.a4.a4 | 1003/1 | 12 | 11 | p4 | NO FAILURE |
| 1001 | 5 | a5.a5.a5.a5 | 1003/2 |    |    | p5 | NO FAILURE |
| 1010 | 1 | j1.j1.j1.j1 | 1008/1 | 11 | 12 | q1 | NO FAILURE |
| 1010 | 2 | j2.j2.j2.j2 | 1008/2 |    |    | q2 | NO FAILURE |
| 1010 | 3 | j3.j3.j3.j3 | 1008/3 |    |    | q3 | NO FAILURE |
| 1010 | 4 | j4.j4.j4.j4 | 1009/1 | 12 | 11 | q4 | NO FAILURE |
| 1010 | 5 | j5.j5.j5.j5 | 1009/2 |    |    | q5 | NO FAILURE |

COMMUNICATION ROUTE DETERMINATION SYSTEM AND COMMUNICATION ROUTE DETERMINATION METHOD

RELATED APPLICATIONS

The present application is a National Phase of International Application Number PCT/JP2022/016255, filed Mar. 30, 2022.

TECHNICAL FIELD

The present invention relates to a communication route determination system and a communication route determination method.

BACKGROUND ART

In Patent Literature 1, it is described that a transport network manager (TN manager) executes instantiation of a transport network based on a transport network instantiation request.

CITATION LIST

Patent Literature

[Patent Literature 1] JP 2020-536434 A

SUMMARY OF INVENTION

Technical Problem

With the technology as described in Patent Literature 1, it is not possible to accurately determine a communication route satisfying a given performance requirement between two network nodes, such as a transport network.

The present invention has been made in view of the above-mentioned circumstances, and has an object to provide a communication route determination system and a communication route determination method which are capable of accurately determining a communication route satisfying a given performance requirement between two network nodes.

Solution to Problem

In order to solve the above-mentioned problem, according to one embodiment of the present invention, there is provided a communication route determination system including: device data storage means for storing device data indicating, for each of a plurality of network devices included in a communication system, an IP address of the each of the plurality of network devices, performance specifications of the each of the plurality of network devices relating to the IP address, and an IP address of a network device enabled to perform IP communication with the each of the plurality of network devices; communication route determination request reception means for receiving a communication route determination request in which a pair of IP addresses and a performance requirement relating to a communication route between the IP addresses are linked, and which is issued for a network slice provided in the communication system; and communication route determination means for determining, based on the device data, the communication route in the network slice, which passes through at least one of the plurality of network devices, and which satisfies the performance requirement between the IP addresses.

In one aspect of the present invention, the device data indicates presence or absence of a failure in the each of the plurality of network devices relating to the IP address, and the communication route determination means is configured to determine, based on the device data, the communication route satisfying the performance requirement between the IP addresses and being a communication route between the IP addresses that has caused no failure.

Further, in one aspect of the present invention, the communication route determination means is configured to determine an active communication route and a standby communication route that satisfy the performance requirement between the IP addresses.

In this aspect, the communication route determination system may further include communication route control means for controlling, in a situation in which a failure has not occurred in the active communication route, communication between the IP addresses so that communication on the active communication route is executed, and controlling, in a situation in which a failure has occurred in the active communication route, the communication between the IP addresses so that communication on the standby communication route is executed.

Further, at least a part of the standby communication route may be at least a part of the active communication route in a network slice different from a network slice to which the standby communication route belongs.

Further, according to one embodiment of the present invention, there is provided a communication route determination method including the steps of: receiving a communication route determination request in which a pair of IP addresses and a performance requirement relating to a communication route between the IP addresses are linked, and which is issued for a network slice provided in a communication system; and determining, based on device data, the communication route in the network slice, which passes through at least one of a plurality of network devices included in the communication system, and which satisfies the performance requirement between the IP addresses, the device data indicating, for each of the plurality of network devices, an IP address of the each of the plurality of network devices, performance specifications of the each of the plurality of network devices relating to the IP address, and an IP address of a network device enabled to perform IP communication with the each of the plurality of network devices.

BRIEF DESCRIPTION OF DRAWINGS

FIG. 6 is a diagram for illustrating an example of data structure of physical inventory data.

FIG. 7 is a table for showing an example of node address data.

FIG. 8 is a table for showing an example of AG data.

FIG. 10 is a table for showing an example of the node address data.

FIG. 13 is a table for showing an example of the AG data.

DESCRIPTION OF EMBODIMENTS

One embodiment of the present invention is now described in detail with reference to the drawings.

Figure 1:
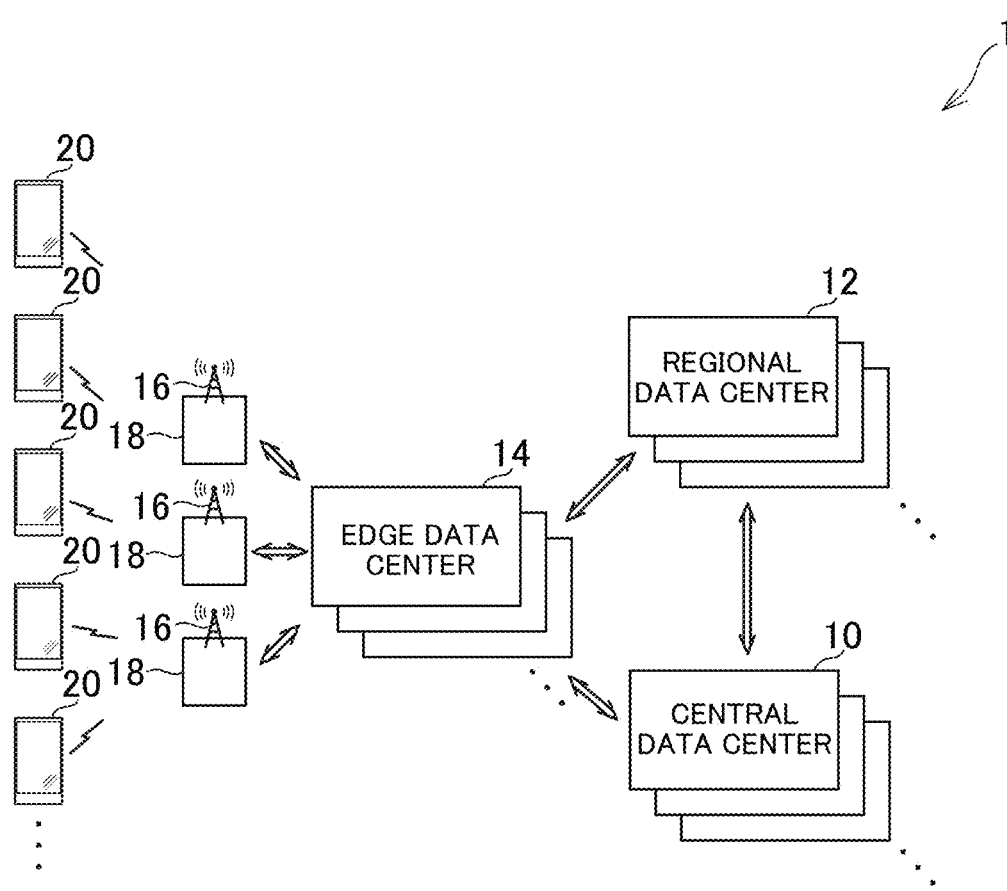
FIG. 1 is a diagram for illustrating an example of a communication system in one embodiment of the present invention.
Figure 2:
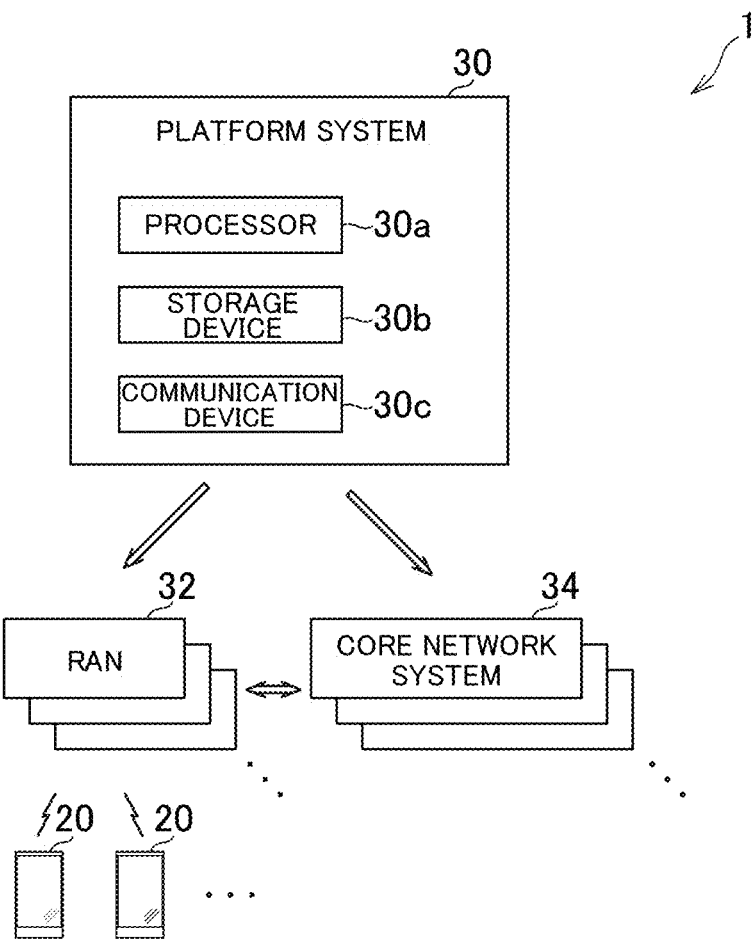
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate with a communication facility 18 provided with an antenna 16. In this case, as illustrated in FIG. 1, one edge data center 14 may be capable of communicating with several communication facilities 18. The communication facility 18 may include a computer such as a server computer. The communication facility 18 in this embodiment performs radio communication with a user equipment (UE) 20 via the antenna 16.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate with one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G").

The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface such as a network interface controller (NIC) or a wireless local area network (LAN) module. Software-defined networking (SDN) may be implemented in the communication device 30c. The communication device 30c exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service such as a voice communication service, a data communication service, or the like is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication with other users via the RAN 32 or the core network system 34. The UE 20 of the end user can also access a data network such as the Internet via the PAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
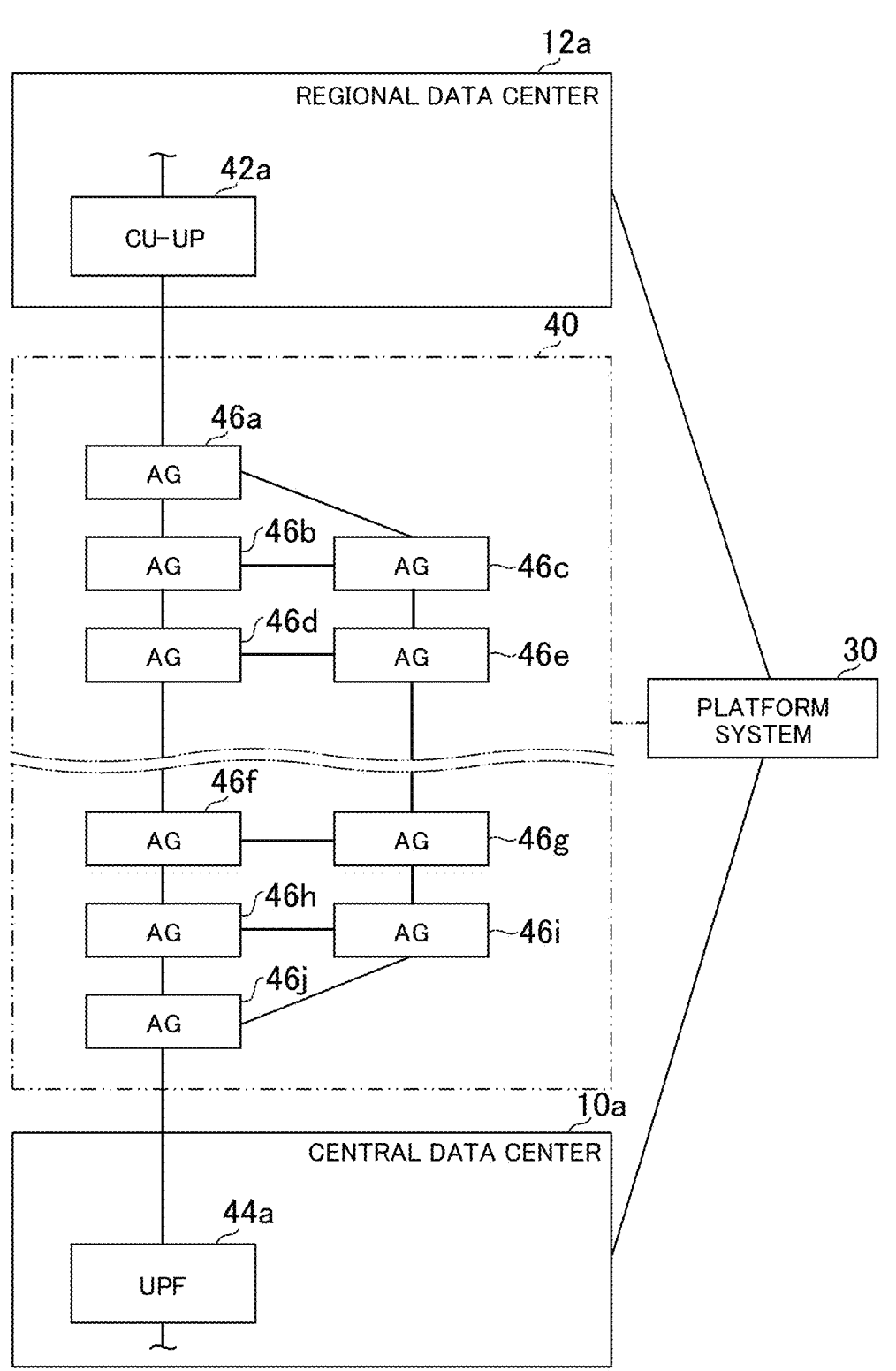
FIG. 3 is a diagram for schematically illustrating an example of a communication between a regional data center and a central data center.

FIG. 3 is a diagram for schematically illustrating an example of communication between a regional data center 12a and a central data center 10a in this embodiment. The regional data center 12a is one of the regional data centers 12 illustrated in FIG. 1, and the central data center 10a is one of the central data centers 10 illustrated in FIG. 1. As illustrated in FIG. 3, the regional data center 12a and the central data center 10a can communicate with each other through a transport network 40. The transport network 40 illustrated in FIG. 3 corresponds to a mobile back haul (MBH) being a communication route between the RAN 32 and the core network system 34.

In the example of FIG. 3, a central unit-user plane (CU-UP) 42a is constructed in the regional data center 12a, and a user plane function (UPF) 44a is constructed in the central data center 10a.

Meanwhile, in the transport network 40 illustrated in FIG. 3, a plurality of aggregation routers (AGs) 46 (AG 46a to AG 46j) are arranged, and communication between the CU-UP 42a and the UPF 44a is performed through those AGs 46.

Figure 4:
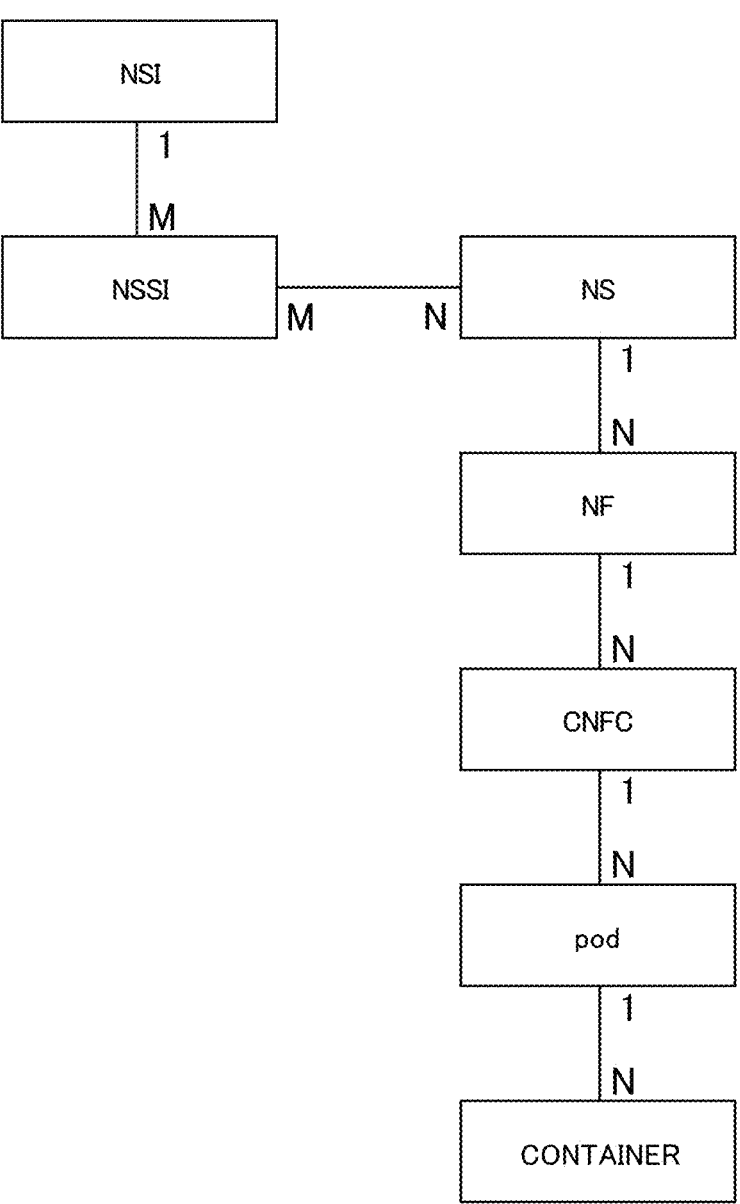
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the DU, a central unit-control plane (CU-CP), the CU-UP, an access and mobility management function (AMF), a session management function (SMF), or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NFs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile back haul (MBH) domain, or a slice of a core network domain. In this description, the slice of the transport domain is also referred to as "transport slice."

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
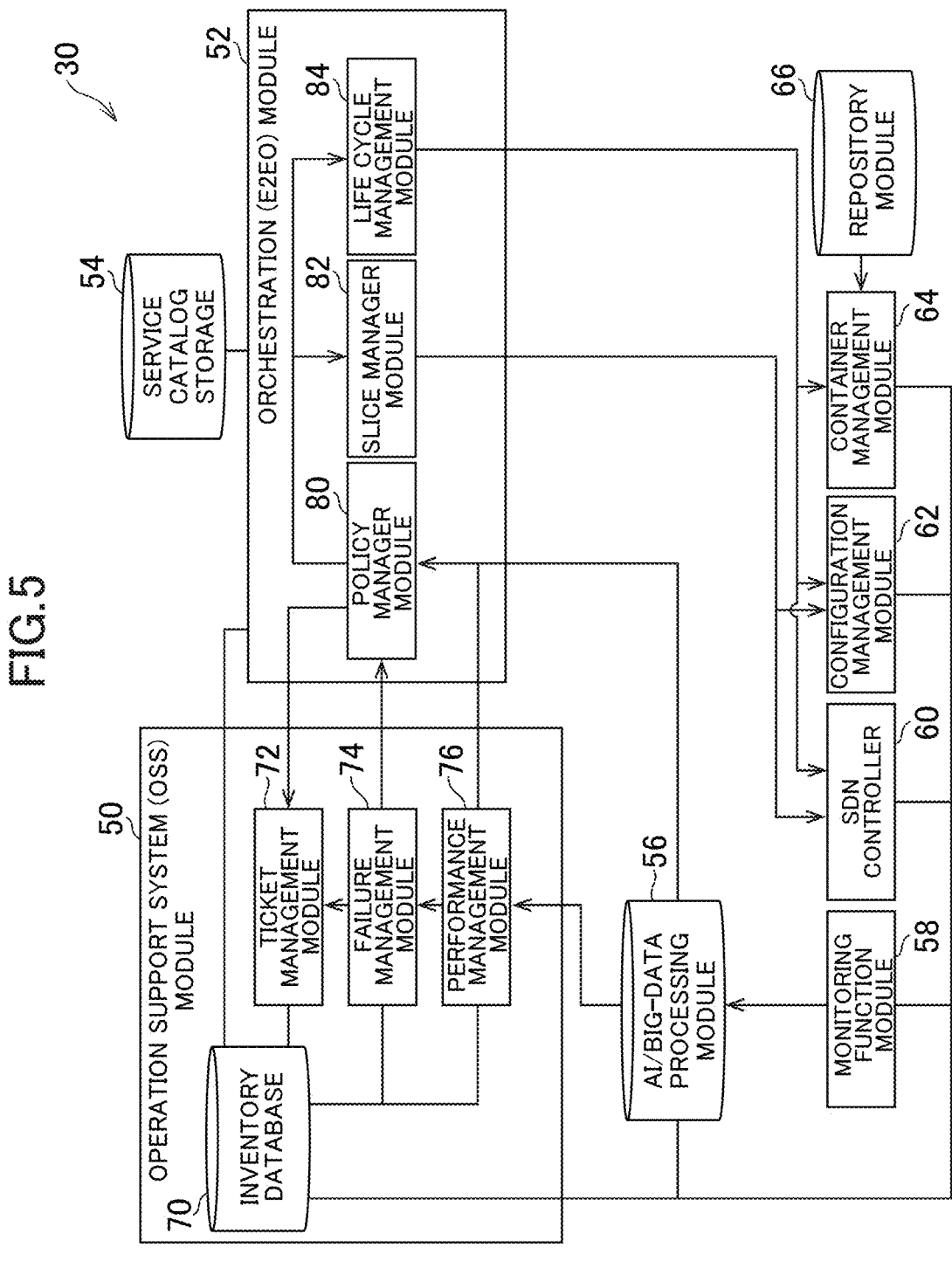
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation support system (OSS) module 50, an orchestration (end-to-end-orchestration (E2EO)) module 52, a service catalog storage 54, an AI/big-data processing module 56, a monitoring function module 58, an SDN controller 60, a configuration management module 62, a container management module 64, and a repository module 66. The OSS module 50 includes an inventory database 70, a ticket management module 72, a failure management module 74, and a performance management module 76. The E2EO module 52 includes a policy manager module 80, a slice manager module 82, and a life cycle management module 84. Those elements are implemented mainly by the processor 30a, the storage device 30b and the communication device 30c.

The functions illustrated in FIG. 5 may be implemented by executing, by the processor 30a, a program that is installed in the platform system 30, which is one or a plurality of computers, and that includes instructions corresponding to the functions. This program may be supplied to the platform system 30 via a computer-readable information storage medium such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container management module 64 executes life cycle management of a container. For example, the life cycle management includes processes relating to the construction of the container such as the deployment and setting of the container.

In this case, the platform system 30 in this embodiment may include a plurality of container management modules 64. In each of the plurality of container management modules 64, a container management tool such as Kubernetes, and a package manager such as Helm may be installed. Each of the plurality of container management modules 64 may execute the construction of a container such as the deployment of the container for a server group (for example, Kubernetes cluster) associated with the container management module 64.

The container management module 64 is not required to be included in the platform system 30. The container management module 64 may be provided in, for example, a server (that is, the RAN 32 or the core network system 34) managed by the container management module 64, or another server that is annexed to the server managed by the container management module 64.

In this embodiment, the repository module 66 stores, for example, a container image of a container included in a functional unit group (for example, NF group) that implements a network service.

The inventory database 70 is a database in which inventory information is stored. The inventory information includes, for example, information on a server arranged in the RAN 32 or the core network system 34 and managed by the platform system 30.

Further, in this embodiment, the inventory database 70 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports, and the like.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF.

The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance of the CNFC and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NS-SAI, which is set for each NF.

Further, the inventory database 70 can appropriately grasp the resource status in cooperation with the container management module 64. Then, the inventory database 70 appropriately updates the inventory data stored in the inventory database 70 based on the latest resource status.

Further, for example, the inventory database 70 updates the inventory data stored in the inventory database 70 in accordance with execution of an action such as construction of a new element included in the communication system 1, a change of a configuration of the elements included in the communication system 1, scaling of the elements included in the communication system 1, or replacement of the elements included in the communication system 1.

The inventory database 70 may also store inventory information for a plurality of network devices including switches and ACI fabrics arranged in the data centers and the AG 46 arranged in the transport network 40 such as the MBH.

For example, the inventory database 70 may store inventory data indicating, for example, a topology of AGs arranged between data centers, performance specifications of each AG, and an IP address set for a port of each AG.

The inventory database 70 may also store inventory data indicating a physical capacity (total capacity) of the communication route.

The inventory database 70 may also store inventory data regarding a communication route between network devices and indicating, for example, a capacity of the communication route to which a virtual path in segment routing such as SRv6 has been assigned and a capacity of the communication route to which a virtual path has not been assigned (free logical capacity).

The inventory database 70 may also store inventory data indicating, for each NF included in the communication system 1, a network device (for example, default gateway) through which a packet to be transmitted from the NF to the outside always passes. In this case, for example, for each data center, a network device through which a packet to be transmitted from the NF constructed in the data center to the outside always passes may be determined in advance.

The service catalog storage 54 stores service catalog data. The service catalog data may include, for example, service template data indicating the logic to be used by the life cycle management module 84 or the like. This service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the service template data. The CNFD may indicate computer resources (CPU, memory, hard disk drive, and the like) required by the CNF. For example, the CNFD may also indicate, for each of a plurality of containers included in the CNF, computer resources (CPU, memory, hard disk drive, and the like) required by the container.

The service catalog data may also include information to be used by the policy manager module 80, the information relating to a threshold value (for example, threshold value for abnormality detection) to be compared to the calculated performance index value. The performance index value is described later.

The service catalog data may also include, for example, slice template data. The slice template data includes information required for executing instantiation of the network slice, and includes, for example, the logic to be used by the slice manager module 82.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle management module 84 constructs a new network service for which a purchase request has been made in response to the purchase request for the NS by the purchaser.

The life cycle management module 84 may execute, for example, the workflow script associated with the network service to be purchased in response to the purchase request. Then, the life cycle management module 84 may execute this workflow script, to thereby instruct the container management module 64 to deploy the container included in the new network service to be purchased. Then, the container management module 64 may acquire the container image of the container from the repository module 66 and deploy a container corresponding to the container image in the server.

In addition, in this embodiment, the life cycle management module 84 executes, for example, scaling or replacement of the element included in the communication system 1. In this case, the life cycle management module 84 may output a container deployment instruction or deletion instruction to the container management module 64. Then, the container management module 64 may execute, for example, a process for deploying a container or a process for deleting a container in accordance with the instruction. In this embodiment, the life cycle management module 84 can execute such scaling and replacement that cannot be handled by Kubernetes of the container management module 64 or other tools.

The life cycle management module 84 may also output an instruction to create a communication route to the SDN controller 60. For example, the life cycle management module 84 presents, to the SDN controller 60, two IP addresses at both ends of a communication route to be created, and the SDN controller 60 creates a communication route connecting those two IP addresses to each other. The created communication route may be managed so as to be linked to those two IP addresses.

The life cycle management module 84 may also output to the SDN controller 60 an instruction to create a communication route between two IP addresses linked to the two IP addresses.

In this embodiment, the slice manager module 82 executes, for example, instantiation of a network slice. In this embodiment, the slice manager module 82 executes, for example, instantiation of a network slice by executing the logic indicated by the slice template stored in the service catalog storage 54.

The slice manager module 82 includes, for example, a network slice management function (NSMF) and a network slice sub-network management function (NSSMF) described in the third generation partnership project (3GPP) specification "TS28 533." The NSMF is a function for generating and managing network slices, and provides an NSI management service. The NSSMF is a function for generating and managing network slice subnets forming a part of a network slice, and provides an NSSI management service.

The slice manager module 82 may output to the configuration management module 62 a configuration management instruction related to the instantiation of the network slice.

Then, the configuration management module 62 may execute configuration management such as settings in accordance with the configuration management instruction.

The slice manager module 82 may also present, to the SDN controller 60, two IP addresses to output an instruction to create a communication route between those two IP addresses.

In this embodiment, for example, the configuration management module 62 executes configuration management such as settings of the element group including the NFs in accordance with the configuration management instruction received from the life cycle management module 84 or the slice manager module 82.

In this embodiment, for example, the SDN controller 60 creates the communication route between the two IP addresses linked to the creation instruction in accordance with the instruction to create the communication route, which is received from the life cycle management module 84 or the slice manager module 82. The SDN controller 60 may create a communication route between two IP addresses through use of, for example, a publicly known path calculation method such as Flex Algo.

In this case, for example, the SDN controller 60 may use segment routing technology (for example, segment routing IPv6 (SRv6)) to construct an NSI and NSSI for the server or an aggregation router present between communication routes. The SDN controller 60 may also generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 60 may change the upper limit of the bandwidth that can be used for communication between two IP addresses without constructing a network slice.

The platform system 30 in this embodiment may include a plurality of SDN controllers 60. Each of the plurality of SDN controllers 60 may execute a process such as the creation of a communication route for a network device group including the AGs associated with the SDN controller 60.

In this embodiment, the monitoring function module 58 monitors, for example, the element group included in the communication system 1 based on a given management policy. In this case, for example, the monitoring function module 58 may monitor the element group based on a monitoring policy designated by the purchaser when the purchaser purchases the network service.

In this embodiment, the monitoring function module 58 executes monitoring at various levels, such as a slice level, an NS level, an NF level, a CNFC level, and a level of hardware such as the server.

For example, the monitoring function module 58 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitoring function module 58. Further, the server may output the metric data indicating a metric relating to the hardware that can be measured (can be identified) by the server to the monitoring function module 58.

In addition, for example, the monitoring function module 58 may deploy, in the server, a sidecar container for aggregating the metric data indicating the metrics output from a plurality of containers in units of CNFCs (microservices).

This sidecar container may include an agent called "exporter." The monitoring function module 58 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitoring function module 58 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitoring function module 58 may acquire metric data indicating the performance index values to be monitored.

Then, for example, when the monitoring function module 58 acquires the above-mentioned metric data, the monitoring function module 58 outputs the metric data to the AI/big data processing module 56.

Further, the elements such as the network slice, the NS, the NF, the CNFC that are included in the communication system 1 and the hardware such as the server notify the monitoring function module 58 of various alerts (for example, notify the monitoring function module 58 of an alert with the occurrence of a failure as a trigger).

Then, for example, when the monitoring function module 58 receives the above-mentioned notification of the alert, the monitoring function module 58 outputs the notification to the AI/big-data processing module 56.

In this embodiment, the AI/big-data processing module 56 accumulates, for example, pieces of metric data and notifications of the alerts that have been output from the monitoring function module 58. In addition, in this embodiment, for example, the AI/big-data processing module 56 stores in advance a trained machine learning model.

Then, in this embodiment, for example, the AI/big-data processing module 56 executes, based on the accumulated pieces of metric data and the above-mentioned machine learning model, an estimation process such as a future prediction process for a use status and quality of service of the communication system 1. The AI/big-data processing module 56 may generate estimation result data indicating results of the estimation process.

In this embodiment, for example, the performance management module 76 calculates, based on a plurality of pieces of metric data, a performance index value (for example, KPI) that is based on metrics indicated by those pieces of metric data. The performance management module 76 may calculate a performance index value (for example, performance index value relating to an end-to-end network slice) which is a comprehensive evaluation of a plurality of types of metrics and cannot be calculated from a single piece of metric data. The performance management module 76 may generate comprehensive performance index value data indicating a performance index value being a comprehensive evaluation.

The performance management module 76 may acquire the metric data from the monitoring function module 58 through intermediation of the AI/big-data processing module 56 as illustrated in FIG. 5, or may acquire the metric data directly from the monitoring function module 58. The performance management module 76 may also calculate the performance index value based on the above-mentioned estimation result data.

In this embodiment, the failure management module 74 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure management module 74 may detect, for example, the occurrence of a failure that cannot be detected from a single piece of metric data or a single notification of the alert, based on a predetermined logic. The failure management module 74 may also generate detection failure data indicating the detected failure.

The failure management module 74 may acquire the metric data and the notification of the alert directly from the monitoring function module 58 or through intermediation of the AI/big-data processing module 56 and the performance management module 76. The failure management module 74 may also acquire the estimation result data directly from the AI/big-data processing module 56 or through intermediation of the performance management module 76.

In this embodiment, the policy manager module 80 executes a predetermined determination process based on, for example, at least any one of the above-mentioned metric data, the above-mentioned notification of the alert, the above-mentioned estimation result data, the above-mentioned comprehensive performance index value data, or the above-mentioned detection failure data.

Then, the policy manager module 80 may execute an action corresponding to a result of the determination process. For example, the policy manager module 80 may output an instruction to construct a network slice to the slice manager module 82. The policy manager module 80 may also output an instruction for scaling or replacement of the elements to the life cycle management module 84 based on the result of the determination process.

In this embodiment, the ticket management module 72 generates, for example, a ticket indicating information to be notified to an administrator of the communication system 1. The ticket management module 72 may generate a ticket indicating details of the detection failure data. The ticket management module 72 may also generate a ticket indicating a value of the performance index value data or the metric data. The ticket management module 72 may also generate a ticket indicating a determination result obtained by the policy manager module 80.

Then, the ticket management module 72 notifies the administrator of the communication system 1 of the generated ticket. The ticket management module 72 may send, for example, an email to which the generated ticket is attached to an email address of the administrator of the communication system 1.

For example, the policy manager module 80 may output an instruction to construct a network slice, in which the performance requirement is designated, to the slice manager module 82 depending on a result of the predetermined determination process. Then, the slice manager module 82 may instantiate a new network slice satisfying the designated performance requirement in response to the reception of the construction instruction.

Further, in this embodiment, for example, the slice manager module 82 may instantiate a new network slice in response to the purchase request for the NS by the purchaser. In this case, for example, an SLA to be satisfied by the NS to be purchased may be designated by the purchaser, and a new network slice satisfying a performance requirement corresponding to the SLA may be instantiated.

A process performed when the slice manager module 82 cooperates with the life cycle management module 84 to construct a new network slice satisfying a predetermined performance requirement is further described in the following.

FIG. 7 is a table for showing an example of node address data in this embodiment. The node address data in this embodiment is, for example, data indicating, for each of a plurality of network nodes (for example, NFs) included in the communication system 1, an IP address assigned to the network node.

The node address data shown in FIG. 7 includes an NF ID being information identifying an NF, NF type data indicating the type of the NF, and IP address data indicating the IP address of the NF.

In this case, for example, it is assumed that the NF ID of the CU-UP 42a illustrated in FIG. 3 has a value of "101", and the NF ID of the UPF 44a has a value of "501". As shown in FIG. 7, it is also assumed that "a0.a0.a0.a0" is set as the IP address of the CU-UP 42a, and "b0.b0.b0.b0" is set as the IP address of the UPF 44a.

In addition, in this embodiment, as the inventory data, the inventory database 70 stores device data indicating, for each of the plurality of network devices included in the communication system 1, an IP address of the network device, performance specifications of that network device relating to the IP address, and an IP address of a network device enabled to perform IP communication with that network device.

FIG. 8 is a table for showing an example of AG data being an example of the device data in this embodiment. The AG data in this embodiment indicates, for example, an IP address of an AG, performance specifications of that AG relating to the IP address, and an IP address of an AG enabled to perform IP communication with that AG.

As shown in FIG. 8, the AG data in this embodiment includes an AG ID, a port ID, IP address data, connection port data, an active slice ID, a standby slice ID, capacity data, and failure presence-or-absence data.

The AG data is data associated with a port provided to the AG. The AG ID included in the AG data is identification information on the AG. In this case, for example, it is assumed that the AG ID of the AG 46a illustrated in FIG. 3 has a value of "1001", the AG ID of the AG 46b has a value of "1002", and the AG ID of the AG 46c has a value of "1003". It is also assumed that the AG ID of the AG 46h illustrated in FIG. 3 has a value of "1008", the AG ID of the AG 46i has a value of "1009", and the AG ID of the AG 46j has a value of "1010".

The port ID included in the AG data is identification information on a port provided to the AG associated with the AG data.

The IP address data included in the AG data is data indicating an IP address assigned to the port associated with the AG data.

The connection port data included in the AG data is data indicating a port being a connection destination to which the port associated with the AG data is connected. In the example of FIG. 8, the value of the connection port data is represented by a combination of the value of the AG ID of the AG at the connection destination and the value of the port ID of the port being the connection destination.

In FIG. 8, it is shown that ports of the AG 46a (with the AG ID having the value of "1001" as described above) which have port IDs of from "1" to "3" are connected to ports of the AG 46b (with the AG ID having the value of "1002" as described above) which have port IDs of from "1" to "3", respectively. It is also shown that ports of the AG 46a which have port IDs of "4" and "5" are connected to ports of the AG 46c (with the AG ID having the value of "1003" as described above) which have port IDs of "1" and "2", respectively.

It is also shown that ports of the AG 46j (with the AG ID having the value of "1010" as described above) which have port IDs of from "1" to "3" are connected to ports of the AG 46h (with the AG ID having the value of "1008" as described above) which have port IDs of from "1" to "3", respectively. It is also shown that ports of the AG 46j which have port IDs of "4" and "5" are connected to ports of the AG 46i (with the AG ID having the value of "1009" as described above) which have port IDs of "1" and "2", respectively.

In this embodiment, in regard to each network device, the IP address of a network device enabled to perform IP communication with that network device can be identified based on the IP address data and the connection port data, which are included in the AG data. Accordingly, it can be said that the AG data in this embodiment indicates, for each of the plurality of network devices included in the communication system 1, the IP address of a network device enabled to perform IP communication with that network device.

The active slice ID included in the AG data is a slice ID of a network slice to which the port associated with the AG data is assigned as an active communication route. The standby slice ID included in the AG data is a slice ID of a network slice to which the port associated with the AG data is assigned as a standby communication route. In this case, it is assumed that the slice ID in this embodiment indicates the identification information (for example, S-NSSAI) on the network slice. The active communication route is assumed to be a communication route used when a failure has not occurred, and the standby communication route is assumed to be a communication route used when a failure has occurred in the active communication route. However, the standby communication route may be used simultaneously with the active communication route in order to take over some of packets flowing through the active communication route.

In the example of FIG. 8, it is shown that a communication route including the port of the AG 46a (with the AG ID having the value of "1001" as described above) which has the port ID of "1" and the port of the AG 46j (with the AG ID having the value of "1010" as described above) which has the port ID of "1" is assigned to the network slice having a slice ID of "11" as the active communication route. Further, it is shown that a communication route including the port of the AG 46a which has the port ID of "4" and the port of the AG 46j which has the port ID of "4" is assigned to the network slice having the slice ID of "11" as the standby communication route.

In the example of FIG. 8, the active slice ID has a blank value for a port that is not assigned to the active communication route included in the network slice. Further, the standby slice ID has a blank value for a port that is not assigned to the standby communication route included in the network slice.

Control relating to the active communication route and the standby communication route is described later.

The capacity data included in the AG data is data indicating a capacity (for example, bandwidth) of the port associated with the AG data. In the example of FIG. 8, the capacities of respective ports are represented by symbols "p1" to "p5" and symbols "q1" to "q5". The capacity data corresponds to an example of performance specification data indicating the performance specifications of the network device.

The failure presence-or-absence data included in the AG data is data indicating presence or absence of a failure in the port associated with the AG data. In the example of FIG. 8, "WITH FAILURE" is set as a value of the failure presence-or-absence data for the port in which a failure has been detected, and "NO FAILURE" is set as a value of the failure presence-or-absence data for the port in which a failure has not been detected.

The node address data and the AG data may be stored, for example, in the inventory database 70 as the inventory data.

Figure 9:
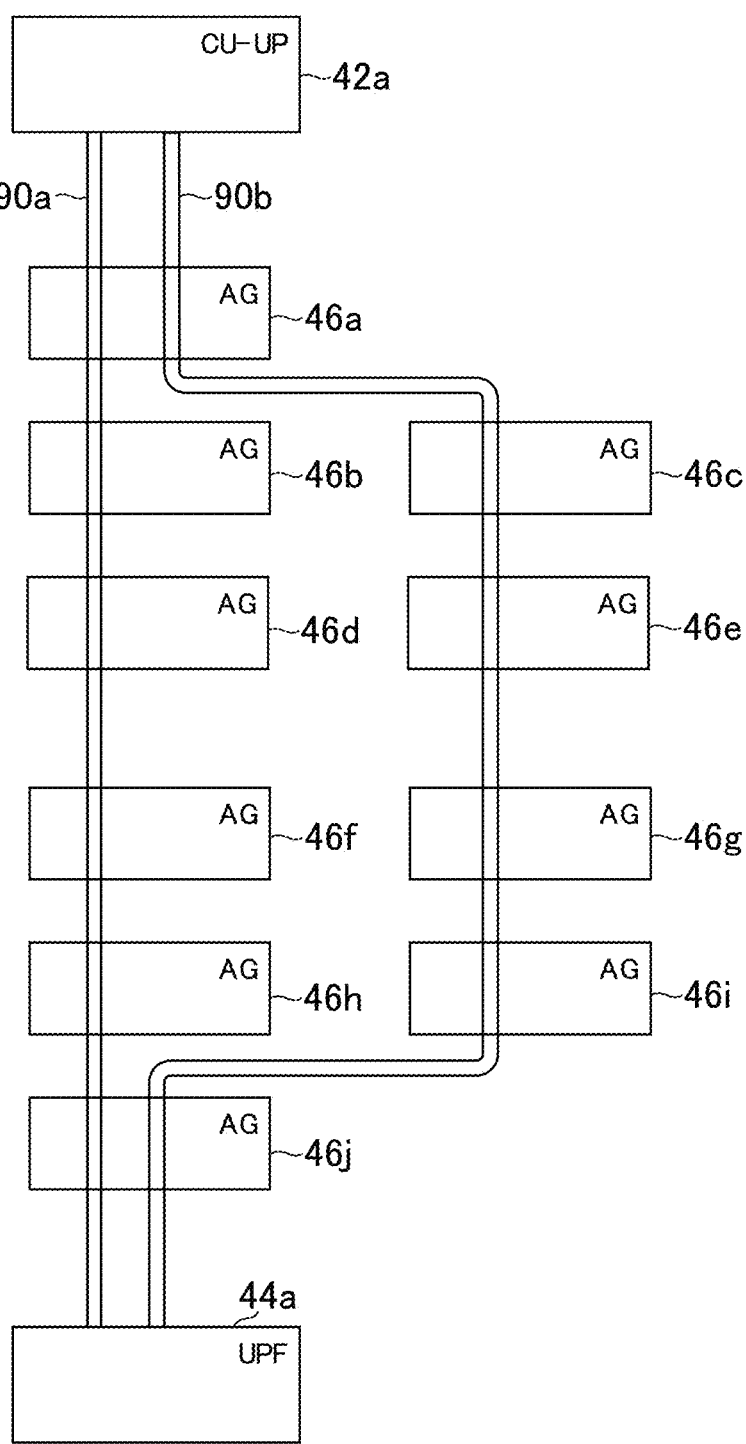
FIG. 9 is a diagram for illustrating an example of a communication route.

Further, in this embodiment, a communication route 90*a* illustrated in FIG. 9 is formed as the active communication route included in the network slice (transport slice) having the slice ID of "11". The communication route 90*a* is a communication route that passes through the CU-UP 42*a*, the AG 46*a*, the AG 46*b*, the AG 46*d*, the AG 46*f*, the AG 46*h*, the AG 46*j*, and the UPF 44*a*, which are illustrated in FIG. 3. More specifically, the communication route 90*a* passes through at least the port of the AG 46*a* which has the port ID of "1", the port of the AG 46*b* which has the port ID of "1", the port of the AG 46*h* which has the port ID of "1", and the port of the AG 46*j* which has the port ID of "1".

Further, in this embodiment, a communication route 90*b* illustrated in FIG. 9 is formed as the standby communication route included in the network slice (transport slice) having the slice ID of "11". The communication route 90*b* is a communication route that passes through the CU-UP 42*a*, the AG 46*a*, the AG 46*c*, the AG 46*e*, the AG 46*g*, the AG 46*i*, the AG 46*j*, and the UPF 44*a*, which are illustrated in FIG. 3. More specifically, the communication route 90*b* passes through at least the port of the AG 46*a* which has the port ID of "4", the port of the AG 46*c* which has the port ID of "1", the port of the AG 46*i* which has the port ID of "1", and the port of the AG 46*j* which has the port ID of "4".

The communication route 90*a* and the communication route 90*b* also form a part of a communication route of the end-to-end network slice in the network service including the CU-UP 42*a* and the UPF 44*a*. It can also be said that the communication route 90*a* and the communication route 90*b* form a part of the communication route of the transport slice being a part of the end-to-end network slice.

For example, as the communication between the AG 46*a*, the AG 46*b*, the AG 46*d*, the AG 46*f*, the AG 46*h*, and the AG 46*j*, packets are transferred by segment routing, for example, as the communication between the AG 46*a*, the AG 46*c*, the AG 46*e*, the AG 46*g*, the AG 46*i*, and the AG 46*j*, packets are transferred by segment routing.

In this embodiment, for example, the slice manager module 82 recognizes that a transport slice is formed between the CU-UP 42*a* and the UPF 44*a*, but is not required to recognize which AG 46 is passed by the communication route of the transport slice.

Meanwhile, in this embodiment, for example, the SDN controller 60 recognizes the IP addresses of endpoints of the transport slice and recognizes that the transport slice corresponds to the communication route 90*a* that passes through the AG 46*a*, the AG 46*b*, the AG 46*d*, the AG 46*f*, the AG 46*h*, and the AG 46*j* and the communication route 90*b* that passes through the AG 46*a*, the AG 46*c*, the AG 46*e*, the AG 46*g*, the AG 46*i*, and the AG 46*j*, but is not required to recognize which NFs of the network slice the transport slice is formed between.

Further, in this embodiment, as described above, the default gateway of the NF constructed in the regional data center 12*a* is determined in advance, and a packet to be transmitted from the CU-UP 42*a* to the UPF 44*a* is set to always pass through the AG 46*a*. Further, the default gateway of the NF constructed in the central data center 10*a* is determined in advance, and a packet to be transmitted from the UPF 44*a* to the CU-UP 42*a* is set to always pass through the AG 46*j*.

Then, in this embodiment, for example, the slice manager module 82 outputs, to the life cycle management module 84, an instruction to construct a CU-UP 42*b* being a new CU-UP 42 in the regional data center 12*a* and an instruction to construct a UPF 44*b* being a new UPF 44 in the central data center 10*a*.

Then, the life cycle management module 84 registers inventory data relating to the CU-UP 42*b* and the UPF 44*b* in the inventory database 70. In this case, the inventory database 70 may assign IP addresses to the CU-UP 42*b* and the UPF 44*b*. Then, as shown in FIG. 10, the inventory database 70 may generate node address data including IP address data indicating the assigned IP addresses and store the node address data in the inventory database 70. In this case, as shown in FIG. 10, it is assumed that the NF ID of the CU-UP 42*b* has a value of "102" and that the IP address assigned to the CU-UP 42*b* is "c0.c0.c0.c0". Further, it is assumed that the NF ID of the UPF 44*b* has a value of "502" and that the IP address assigned to the UPF 44*b* is "d0.d0.d0.d0".

Figure 11:
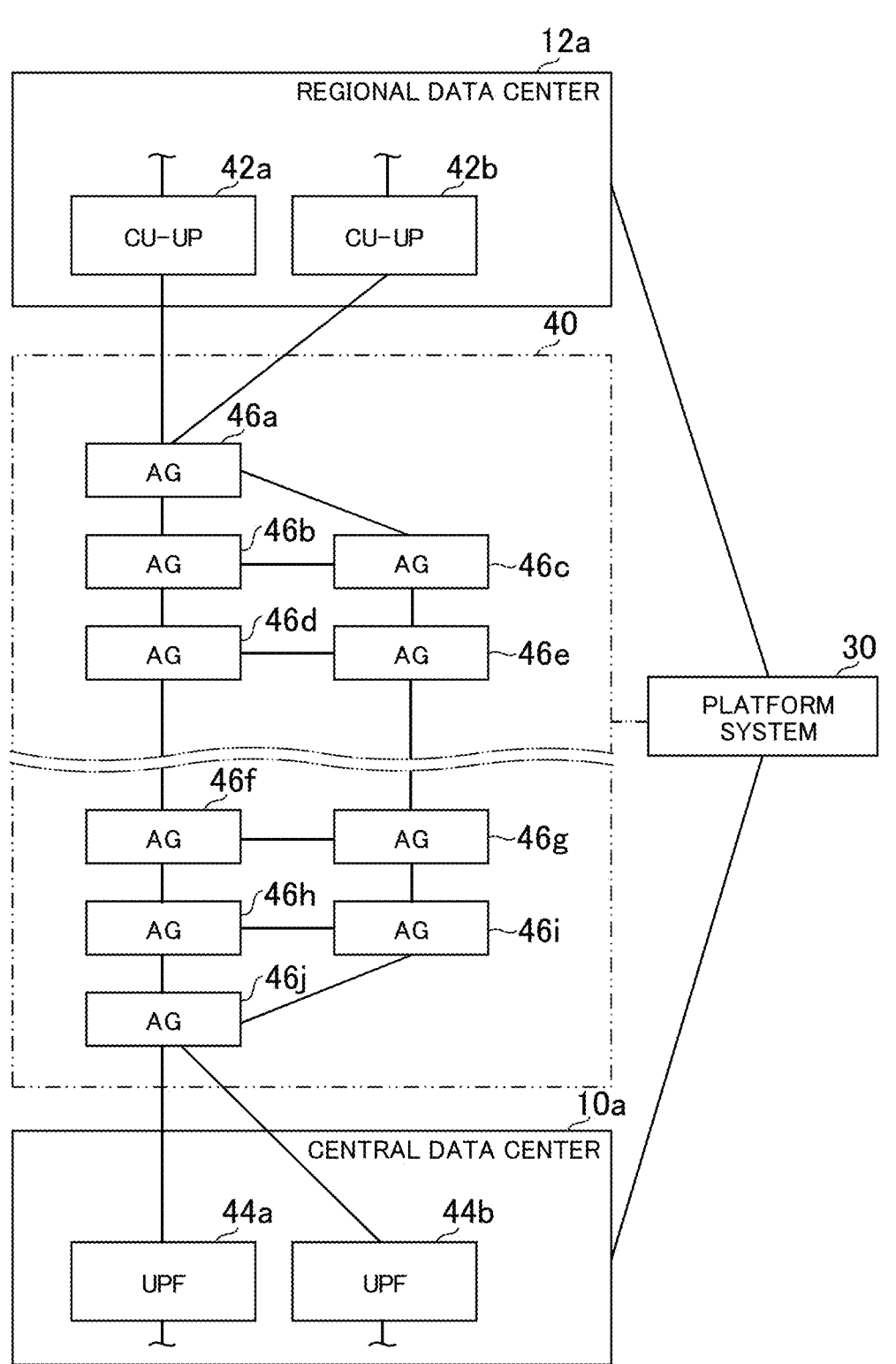
FIG. 11 is a diagram for schematically illustrating an example of communication between the regional data center and the central data center.

Then, the life cycle management module 84 cooperates with the container management module 64 and the configuration management module 62 to construct the CU-UP 42*b* in the regional data center 12*a* and construct the UPF 44*b* in the central data center 10*a* as illustrated in FIG. 11. In this case, "c0.c0.c0.c0" is set as the IP address of the CU-UP 42*b*, and "d0.d0.d0.d0" is set as the IP address of the UPF 44*b*.

As described above, the default gateway of the NF constructed in the regional data center 12*a* is determined in advance, and a packet to be transmitted from the CU-UP 42*b* to the transport network 40 is set to always pass through the AG 46*a*. Further, the default gateway of the NF constructed in the central data center 10*a* is determined in advance, and a packet to be transmitted from the UPF 44*b* to the transport network 40 is set to always pass through the AG 46*j*.

Then, in this embodiment, for example, the slice manager module 82 determines a pair of network nodes belonging to the network slice. For example, the slice manager module 82 determines, in a situation in which a network slice satisfying a predetermined performance requirement is newly constructed, a pair of network nodes belonging to the network slice. In this case, for example, a pair of the CU-UP 42*b* and the UPF 44*b* is determined. The pair of network nodes determined in this manner is hereinafter referred to as "target node pair." It is also assumed that the slice ID of the newly constructed network slice is "12".

Then, in this embodiment, for example, the slice manager module 82 determines an IP address relating to the network slice for each node of the target node pair. In this case, the slice manager module 82 may determine an IP address relating to the transport slice for each node of the target node pair based on the node address data shown in FIG. 10. In this case, for example, "c0.c0.c0.c0" is determined as the IP address of the CU-UP 42*b*. In addition, "d0.d0.d0.d0" is determined as the IP address of the UPF 44*b*. The IP addresses determined in this manner are hereinafter referred to as "target addresses."

Then, the slice manager module 82 determines, in accordance with a rule defined in advance, a performance requirement to be satisfied by the communication route between the target addresses based on a performance requirement to be satisfied by the network slice to be constructed. Then, the slice manager module 82 outputs, to the SDN controller 60 associated with the transport network 40, an instruction to create a communication route.

In this embodiment, for example, the SDN controller 60 receives a communication route determination request in which a pair of IP addresses and a performance requirement relating to a communication route between the IP addresses are linked. The SDN controller 60 may receive a communication route determination request in which the pair of IP addresses and the performance requirement relating to the communication route between the IP addresses are linked, and which is issued for a network slice provided in the communication system 1. For example, the above-mentioned instruction to create a communication route in this embodiment includes the communication route determination request. In addition, the pair of IP addresses linked to the creation instruction corresponds to the above-mentioned target address pair.

That is, in this embodiment, for example, the slice manager module 82 outputs, to the SDN controller 60, an instruction to create a communication route, in which the target address pair and the performance requirement relating to the communication route between the target addresses are linked. Then, the SDN controller 60 receives the creation instruction.

Then, the SDN controller 60 determines a communication route passing through at least one network device and satisfying the performance requirement between the target addresses, based on the device data. The SDN controller 60 may determine a communication route of the network slice, which passes through at least one network device, and satisfies the performance requirement between the target addresses, based on the device data.

In this embodiment, for example, the SDN controller 60 is notified of the IP addresses that are the endpoints of the transport slice, but is not notified of information relating to network nodes for which those IP addresses are set.

In this case, for example, it is assumed that the performance requirement to be satisfied by the network slice to be constructed is a requirement relating to the capacity (for example, bandwidth) (hereinafter referred to as "capacity requirement"), and that the capacity requirement has a value of "r1". In this case, the value of the capacity requirement relating to the communication route between the target addresses may be determined as "r1".

Then, the SDN controller 60 may determine a communication route satisfying the capacity requirement between the target addresses based on, for example, the value "r1" of the capacity requirement determined in this manner and the capacity data included in the AG data.

For example, the SDN controller 60 first determines the AG 46a as the AG 46 through which a packet to be transmitted from the CU-UP 42b to the transport network 40 always passes.

Then, the SDN controller 60 determines a plurality of pieces of AG data associated with the AG 46a. In this case, for example, the pieces of AG data including "1001" as the value of the AG ID, which are shown in FIG. 8, are determined.

Then, the SDN controller 60 determines, for each of the plurality of pieces of AG data determined in this manner, the value of the capacity associated with that piece of AG data.

In this case, for example, for a piece of AG data associated with a port to which another network slice has not yet been assigned, the value of the capacity data on that piece of AG data is determined as the value of the capacity associated with that piece of AG data. Meanwhile, for a piece of AG data associated with a port to which another network slice has already been assigned, a value obtained by subtracting a value corresponding to the already assigned network slice, which is determined in accordance with a predetermined rule, from the value of the capacity data on that piece of AG data is determined as the value of the capacity associated with that piece of AG data.

Then, the SDN controller 60 selects any one of the pieces of AG data in which the value of the capacity determined in this manner is equal to or smaller than "r1". In this case, for example, it is assumed that a piece of AG data in which the AG ID has the value of "1001" and the port ID is "4" is selected.

After that, in the same manner, the SDN controller 60 sequentially determines network devices (for example, AGs 46 in this case) to be included in the communication route satisfying the capacity requirement between the target addresses. In this case, as described above, ports of the network devices to be included in the communication route satisfying the capacity requirement between the target addresses may be determined.

For example, the same process as the above-mentioned process is executed on the AG 46c being a connection destination to which the port of the AG 46a which has port ID of "4" is connected.

In this case, the piece of AG data having the connection port data indicating the AG ID of the AG 46 for which the above-mentioned process has already been executed is excluded from determination targets. For example, in the above-mentioned process for the AG 46c, the piece of AG data having the connection port data indicating the AG ID of the AG 46a is excluded from the determination targets.

The determination of the network devices included in the communication route satisfying the capacity requirement between the target addresses is repeatedly executed until the port of the AG 46j, which is the AG 46 through which a packet to be transmitted from the UPF 44b to the transport network 40 always passes, is determined.

Then, when the port of the AG 46j is determined, the SDN controller 60 determines a communication route connecting the network devices determined as described above (for example, communication route connecting the ports of the AGs 46 in this case) as the communication route satisfying the capacity requirement between the target addresses.

Further, in this embodiment, the slice manager module 82 may determine a performance requirement for the active communication route and a performance requirement for the standby communication route. For example, it is assumed that the value of the capacity requirement to be satisfied by the network slice to be constructed is "r1". In this case, the value "r1" may be determined as the value of the capacity requirement for the active communication route between the target addresses. In addition, a value of 0.1 times the value "r1" may be determined as a value "r2" of the capacity requirement relating to the standby communication route between the target addresses.

Then, the SDN controller 60 may determine the active communication route and the standby communication route that satisfy the above-mentioned performance requirements between the target addresses. For example, the SDN controller 60 may determine the communication route passing through at least one network device and satisfying the performance requirement for the active communication route between the target addresses, based on the value "r1" of the capacity requirement relating to the active communication route and the device data. In addition, for example, the SDN controller 60 may determine the communication route passing through at least one network device and satisfying the performance requirement for the standby communication route between the target addresses, based on the value "r2" of the capacity requirement relating to the standby communication route and the device data.

Figure 12:
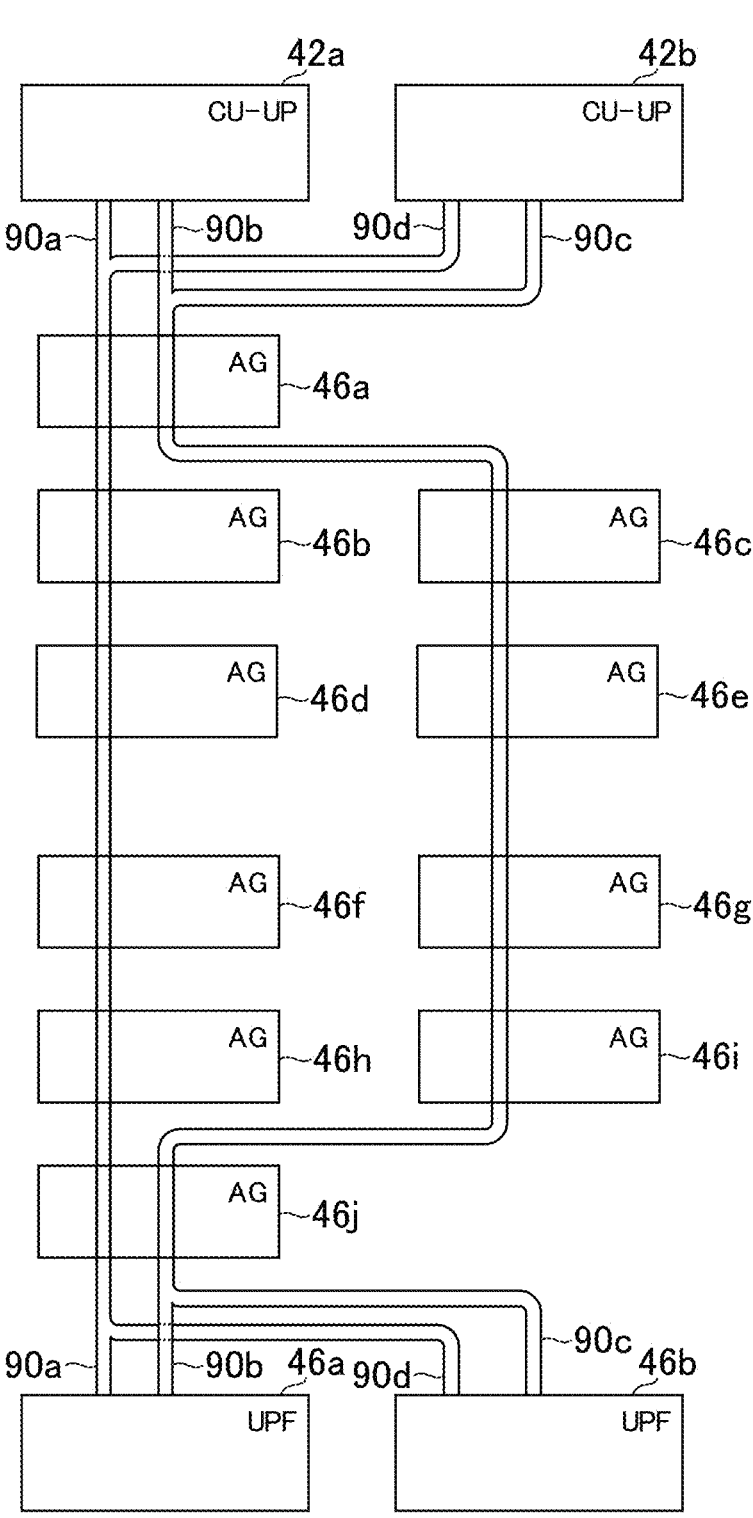
FIG. 12 is a diagram for illustrating an example of the communication route.

In this case, for example, it is assumed that a communication route 90c illustrated in FIG. 12 is determined as a communication route satisfying the capacity requirement for the active communication route between the target addresses. Further, it is assumed that a communication route 90d illustrated in FIG. 12 is determined as a communication route satisfying the capacity requirement for the standby communication route between the target addresses.

Then, the SDN controller 60 performs segment routing setting for the communication route 90c and the communication route 90d that have been determined.

Then, the SDN controller 60 updates the AG data as shown in FIG. 13. In the example of FIG. 13, the value of "12" is set as the value of the active slice ID of each of the AG data associated with the port of the AG 46a (with the AG ID having the value of "1001" as described above) which has the port ID of "4" and the AG data associated with the port of the AG 46j (with the AG ID having the value of "1010" as described above) which has the port ID of "4". Further, the value of "12" is set as the value of the standby slice ID of each of the AG data associated with the port of the AG 46a which has the port ID of "1" and the AG data associated with the port of the AG 46j which has the port ID of "1".

In this manner, the communication route 90c illustrated in FIG. 12 is formed as the active communication route included in the transport slice having the slice ID of "12". Further, the communication route 90d illustrated in FIG. 12 is formed as the standby communication route included in the transport slice having the slice ID of "12".

The communication route 90c is a communication route that passes through the CU-UP 42b, the AG 46a, the AG 46c, the AG 46e, the AG 46g, the AG 46i, the AG 46j, and the UPF 44b, which are illustrated in FIG. 11. More specifically, the communication route 90c passes through at least the port of the AG 46a which has the port ID of "4", the port of the AG 46c which has the port ID of "1", the port of the AG 46i which has the port ID of "1", and the port of the AG 46j which has the port ID of "4".

Further, the communication route 90d is a communication route that passes through the CU-UP 42b, the AG 46a, the AG 46b, the AG 46d, the AG 46f, the AG 46h, the AG 46j, and the UPF 44b, which are illustrated in FIG. 11. More specifically, the communication route 90d passes through at least the port of the AG 46a which has the port ID of "1", the port of the AG 46b which has the port ID of "1", the port of the AG 46h which has the port ID of "1", and the port of the AG 46j which has the port ID of "1".

The communication route 90c and the communication route 90d also form a part of a communication route of the end-to-end network slice in the network service including the CU-UP 42b and the UPF 44b.

As described above, according to this embodiment, it is possible to accurately determine a communication route satisfying a given performance requirement between two network nodes.

In addition, the device data in this embodiment may indicate presence or absence of a failure in the network device relating to the set IP address, as shown in the AG data of FIG. 8 and FIG. 13. In this case, for example, the presence or absence of a failure in the port of the network device may be indicated by the failure presence-or-absence data, as shown in the AG data of FIG. 8 and FIG. 13.

Then, the SDN controller 60 may determine, based on the device data, the communication route satisfying the performance requirement between the target addresses and being a communication route between the target addresses that has caused no failure. For example, in the determination of the communication route, the communication route including the port for which the failure presence-or-absence data has the value of "WITH FAILURE" may be inhibited from being determined.

The SDN controller 60 may also monitor communication quality of the communication route 90a, the communication route 90b, the communication route 90c, and the communication route 90d. Then, the SDN controller 60 may detect occurrence of a failure in the communication route. Then, the SDN controller 60 may update the value of the failure presence-or-absence data in the AG data associated with the communication route in which the occurrence of the failure has been detected from "NO FAILURE" to "WITH FAILURE."

Then, the SDN controller 60 may control, in a situation in which a failure has not occurred in the active communication route, communication between the target addresses so that communication on the active communication route is executed, and may control, in a situation in which a failure has occurred in the active communication route, the communication between the target addresses so that communication on the standby communication route is executed.

For example, in a situation in which a failure has not occurred in the communication route 90a, a packet designated to pass through the network slice having the slice ID of "11" may be controlled to pass through the communication route 90a. Then, in a situation in which a failure has occurred in the communication route 90a, the packet designated to pass through the network slice having the slice ID of "11" may be controlled to pass through the communication route 90b.

Further, in a situation in which a failure has not occurred in the communication route 90c, a packet designated to pass through the network slice having the slice ID of "12" may be controlled to pass through the communication route 90c. Then, in a situation in which a failure has occurred in the communication route 90c, the packet designated to pass through the network slice having the slice ID of "12" may be controlled to pass through the communication route 90d.

Further, as described above, at least a part of the standby communication route may be at least a part of the active communication route in a network slice different from a network slice to which the communication route belongs.

In the above-mentioned example, a part of the communication route 90a being the active communication route belonging to the network slice having the slice ID of "11" corresponds to a part of the communication route 90d being the standby communication route belonging to the network slice having the slice ID of "12". Further, a part of the communication route 90c being the active communication route belonging to the network slice having the slice ID of "12" corresponds to a part of the communication route 90b being the standby communication route belonging to the network slice having the slice ID of "11".

In this manner, the communication route to be actively used in a network slice is prevented from overlapping with the communication route to be actively used in another network slice. Thus, even in an environment in which a plurality of communication routes cannot be created completely independently of one another, it is possible to avoid causing a place in which a large volume of packets are concentrated and become a bottleneck, and it is possible to efficiently utilize resources of the communication system 1.

With this configuration, in a common part of the communication route 90a and the communication route 90d, a large number of packets in the network slice having the slice ID of "11" flow, but few packets in the network slice having the slice ID of "12" flow. Meanwhile, in a common part of the communication route 90b and the communication route 90c, few packets in the network slice having the slice ID of "11" flow, but a large number of packets in the network slice having the slice ID of "12" flow. That is, the packets in the network slice having the slice ID of "11" and the packets in the network slice having the slice ID of "12" are distributed, and traffic volumes in the above-mentioned two common parts are leveled. This enables the resources of the communication system 1 to be efficiently utilized.

Further, in this embodiment, when the communication route is caused to branch off, there is a case in which the communication route satisfies a performance requirement between the target addresses. In such a case, the SDN controller 60 may determine the branching communication route as a communication route satisfying the performance requirement between the target addresses.

Further, the performance requirement in the above-mentioned example is the capacity requirement, but the performance requirement in this embodiment is not required to be the capacity requirement.

For example, the AG data may include performance specification data indicating a latency value or a jitter value. Further, the above-mentioned performance requirements may be a performance requirement relating to latency or jitter. Then, a communication route satisfying the performance requirement relating to latency or jitter between the target addresses may be determined.

Figure 14:
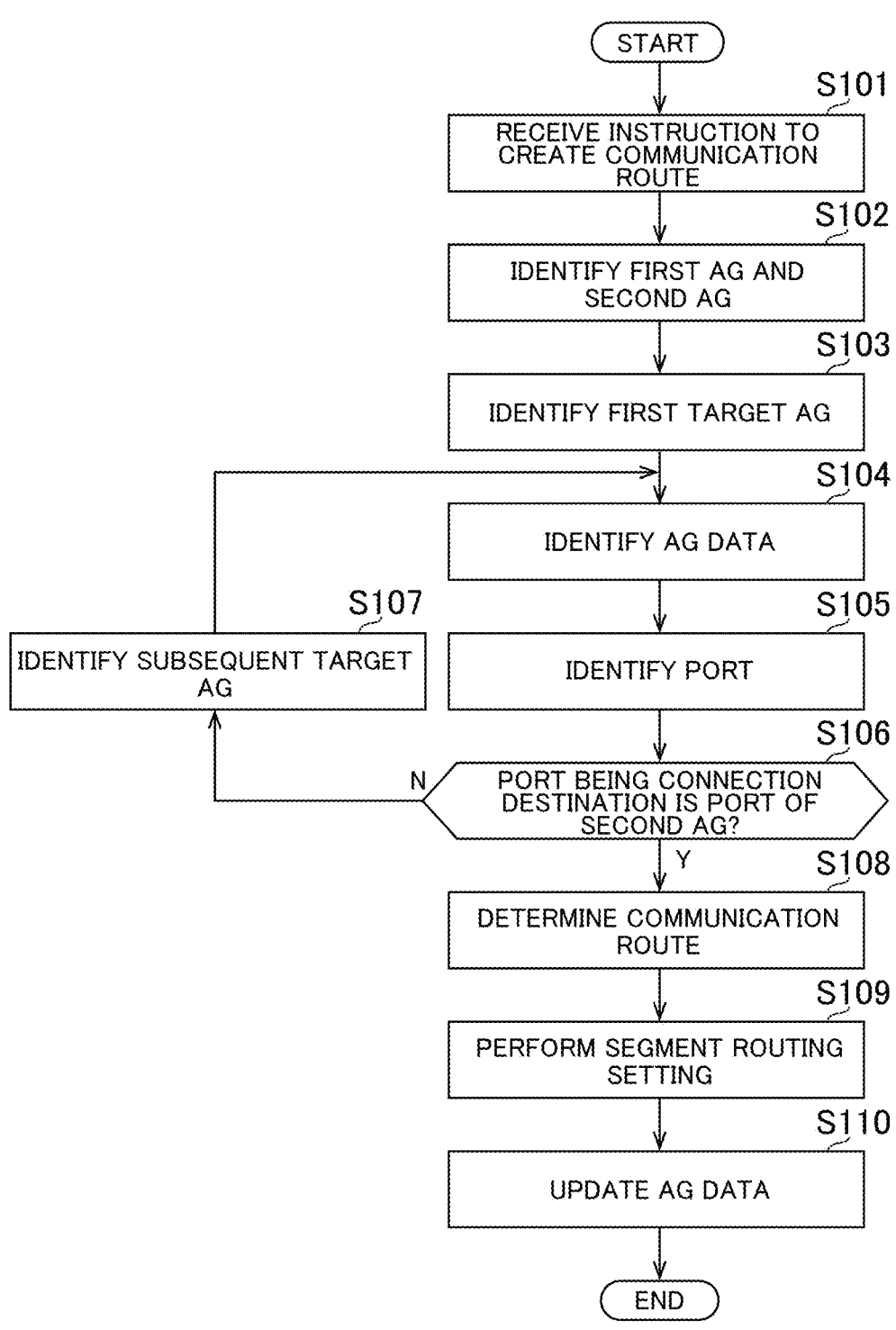
FIG. 14 is a flow chart for illustrating an example of a flow of a process performed by the platform system in the one embodiment of the present invention.

Now, an example of a flow of a process relating to the construction of a network slice performed by the platform system 30 in this embodiment is described with reference to a flow chart exemplified in FIG. 14.

In this case, it is assumed that the performance requirement relating to the communication route between the target addresses is determined in advance by the slice manager module 82.

First, the SDN controller 60 receives, from the slice manager module 82, an instruction to create a communication route in which the target address pair and the performance requirement relating to the communication route between the target addresses are linked (Step S101).

Then, the SDN controller 60 determines, for each of the target addresses, the AG 46 through which the packet to be transmitted from the target address always passes (Step S102). In this case, the SDN controller 60 may determine, based on the inventory data, the AG 46 through which the packet to be transmitted from the target address always passes. The two AGs 46 determined in the process step of Step S102 are hereinafter referred to as "first AG" and "second AG," respectively.

Then, the SDN controller 60 determines the first AG as the first target AG (Step S103).

Then, the SDN controller 60 determines one or a plurality of pieces of AG data including the AG ID of the target AG at the current time point as the value of the AG ID (Step S104).

Then, the SDN controller 60 determines, based on the one or a plurality of pieces of AG data determined in the process step of Step S104, a port satisfying the performance requirement relating to the communication route between the target addresses from among the ports of the AG 46 enabled to perform IP communication with the first AG (Step S105). When there are a plurality of ports that satisfy the performance requirement relating to the communication route between the target addresses, any one of those is determined.

In the process step of Step S105, for example, a port to which another network slice has not yet been assigned may be determined. Further, in a situation in which the active communication route is determined, a port included in the standby communication route included in another network slice may be determined. Further, in a situation in which the standby communication route is determined, a port included in the active communication route included in another network slice may be determined.

Then, the SDN controller 60 examines whether or not the port being the connection destination to which the port determined in the process step of Step S105 is connected is a port of the second AG (Step S106).

When it is confirmed that the port is not a port of the second AG ("N" in Step S106), the SDN controller 60 determines, as the subsequent target AG, the AG 46 including the port determined in the process step of Step S105 (Step S107), and the process returns to the process step of Step S104. In the process step of Step S104 executed thereafter, the piece of AG data in which the AG ID of the AG 46 already determined as the target AG is indicated in the connection port data is excluded from the determination targets.

When it is confirmed in the process step of Step S106 that the port is a port of the second AG ("Y" in Step S106), the SDN controller 60 determines the communication route including at least the port determined in the process step of Step S105 (Step S108).

Then, the SDN controller 60 performs the segment routing setting for the communication route determined in the process step of Step S108 (Step S109).

Then, the SDN controller 60 updates the AG data based on the communication route determined in the process step of Step S108 (Step S110), and the process illustrated in this process example is ended.

It should be noted that the present invention is not limited to the above-mentioned embodiment.

The application range of the present invention is not limited to the situation in which the construction of a new network slice is executed.

In this embodiment, for example, the policy manager module 80 may output a scale-out instruction for a network slice to the slice manager module 82 depending on a result of the predetermined determination process. Then, the slice manager module 82 may execute scale-out of the network slice in response to the reception of the scale-out instruction. Further, at this time, the slice manager module 82 may cooperate with the life cycle management module 84 to execute the scale-out of the network slice involving scale-out of an element such as a UPF.

The present invention is also applicable in, for example, the above-mentioned situation in which the slice manager module 82 executes scale-out of the network slice. For example, in a situation in which scale-out of the network slice is to be executed, the slice manager module 82 may determine a pair of network nodes belonging to the network slice as the target node pair. Then, the slice manager module 82 may determine the target addresses based on the target node pair determined in this manner. Then, the SDN controller 60 may determine the communication route between the target addresses determined in this manner.

Further, the functional unit in this embodiment is not limited to those illustrated in FIG. 3. For example, the functional unit in this embodiment may be an access and mobility management function (AMF), a session management function (SMF), or another network node.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may implemented through use of a hypervisor-type or host-type virtualization technology instead of the container-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

The invention claimed is:

1. A communication route determination system, comprising:

at least one processor; and at least one memory device storing instructions which, when executed by the at least one processor, cause the at least one processor to perform operations comprising:

storing device data indicating, for each of a plurality of network devices included in a communication system, an Internet Protocol (IP) address of the each of the plurality of network devices, performance specifications of the each of the plurality of network devices associated with the IP address, and an IP address of a first network device configured to perform IP communication with the each of the plurality of network devices;

receiving a communication route determination request including a pair of IP addresses and a performance requirement associated with a communication route between the pair of IP addresses that are linked, and which is issued for a network slice provided in the communication system; and determining, based on the device data, the communication route in the network slice, which passes through at least one of the plurality of network devices, and which satisfies the performance requirement between the pair of IP addresses.

2. The communication route determination system according to claim 1, wherein the device data indicates presence or absence of a failure in the each of the plurality of network devices associated with the IP address, and wherein determining the communication route in the network slice comprises determining, based on the device data, the communication route satisfying the performance requirement between the pair of IP addresses and being a communication route between the pair of IP addresses that has caused no failure.

3. The communication route determination system according to claim 1, wherein determining the communication route in the network slice comprises determining an active communication route and a standby communication route that satisfy the performance requirement between the pair of IP addresses.

4. The communication route determination system according to claim 3, the operations further comprise controlling, in a situation in which a failure has not occurred in the active communication route, communication between the pair of IP addresses causing communication on the active communication route to execute, and controlling, in a situation in which a failure has occurred in the active communication route, the communication between the pair of IP addresses so that communication on the standby communication route is executed.

5. The communication route determination system according to claim 3, wherein at least a part of the standby communication route is at least a part of the active communication route in a network slice different from a network slice to which the standby communication route belongs.

6. A communication route determination method, comprising:

receiving a communication route determination request in which a pair of Internet Protocol (IP) addresses and a performance requirement associated with a communication route between the pair of IP addresses are linked, and which is issued for a network slice provided in a communication system; and determining, based on device data, the communication route in the network slice, which passes through at least one of a plurality of network devices in the communication system, and which satisfies the performance requirement between the pair of IP addresses, the device data indicating, for each of the plurality of network devices, an IP address of the each of the plurality of network devices, performance specifications of the each of the plurality of network devices associated with the IP address, and an IP address of a first network device configured to perform IP communication with the each of the plurality of network devices.

* * * * *